Patented Apr. 25, 1939

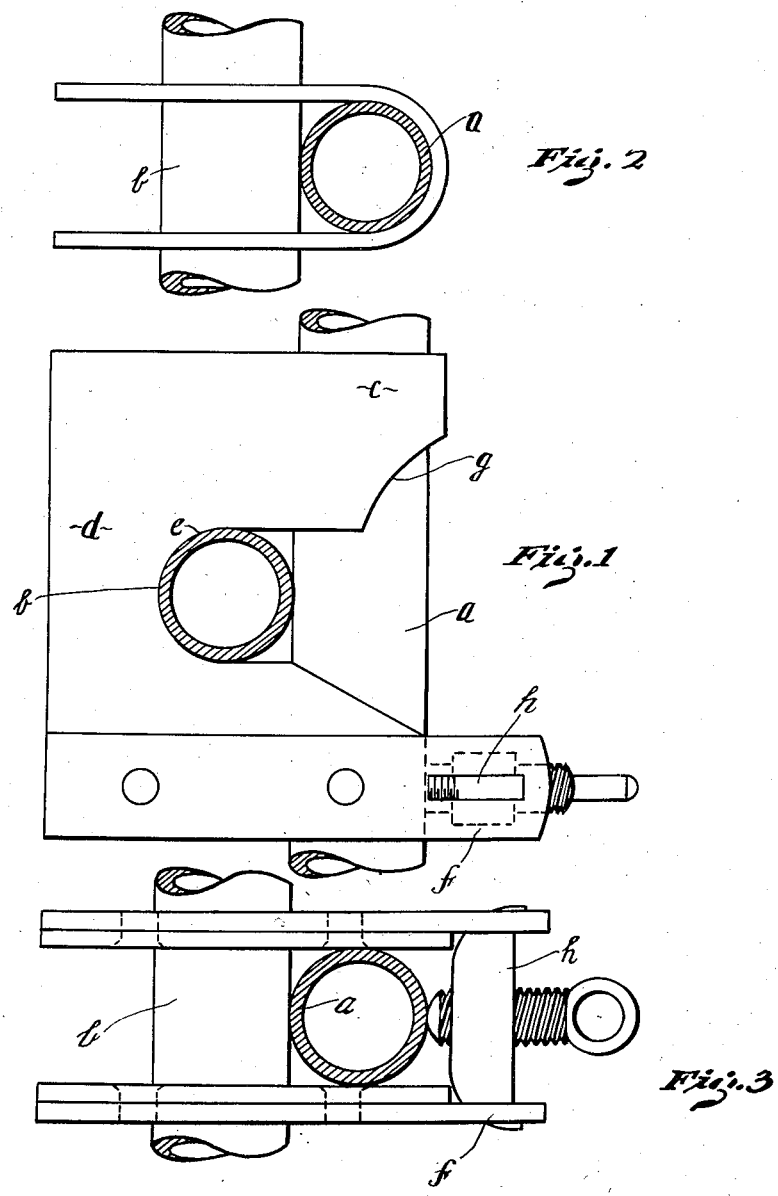

2,156,208

UNITED STATES PATENT OFFICE 2,156,208

TUBULAR SCAFFOLDING BRACKET

Albert Archibald Thornton, Teddington, England, assignor to Thomas Patrick Sheehy and Samuel Emms, both of Kingston-on-Thames, England Application February 23, 1938, Serial No. 192,109
In Great Britain June 3, 1936

3 Claims. (Cl. 189—36)

This invention relates to a releasable fastening device capable of fastening two steel tubes together at right angles and suitable for use in the erection of tubular steel scaffolding.

The object of the invention is to provide an improved fastening device of this character which will be safe and reliable and which will facilitate the rapid erection of tubular steel scaffolding and like structure.

There is a well known class of fastening devices for use in the erection of tubular steel scaffolding in which a U-shaped bracket or saddle is adapted to fit round one tube and to engage and support another tube at right angles thereto with the aid of fastening means by which the two tubes are clamped tightly together.

The releasable fastening device according to the present invention comprises a U-shaped member adapted to fit round one tube and having two legs adapted to hook round and support another tube at right angles to the first tube, fastening means adapted to engage the ends of the aforesaid legs and to bear against the first tube being provided to clamp the second tube tightly between the first tube and the hooked legs.

The invention will be understood from the following description with reference to the drawing wherein:

Fig. 1 is a side elevation of a scaffolding bracket constructed in accordance with the present invention;

Fig. 2 is a top plan view of the bracket shown in Fig. 1; and

Fig. 3 is a bottom plan view of the bracket shown in Fig. 1.

In this drawing, which shows a joint between two tubes in three projections, $a$ and $b$ are two X steel tubes fastened together at right angles by means of a U-shaped bracket $c$ which fits round the tube $a$ and has two legs $d$ hooked round the tube $b$.

In the construction shown in the drawing, the bracket $c$ is made of sheet metal and the legs $d$ are in the form of flat cheeks cut away as shown at $e$ so that they will fit round the tube $b$. The lower parts of these cheeks $e$ have projecting ends $f$ which are brought forward as shown so as to embrace the tube $a$ between them. The bracket is cut away as shown at $g$ to provide the necessary clearance to enable the bracket to be hooked round the tube $b$ or unhooked therefrom by tilting it about its point of bearing against the tube $a$.

The reference letter $h$ represents a detachable fastening device consisting of a bar adapted to be inserted at its ends into slots provided in the projecting ends $f$ of the U-shaped bracket. The bar $h$ carries a screw adapted to be tightened against the tube $a$ as shown so as to clamp the tube $a$ tightly against the parts $e$ of the member $c$.

In the use of the device the two tubes to be fastened together are first brought to the required positions and the bracket is then placed astride one of the tubes and hooked round the other tube. If the bracket is hooked round a transverse tube $b$ from above as shown in the drawing, it will tend to fall into its proper position under the action of gravity, so that it is possible to place the bracket in position practically in a single movement and with the use of one hand only. Moreover the weight of the transverse tube $b$ tends to rock the bracket about its point of bearing against the vertical tube $a$ so that the bracket has a self-locking action, i. e. the two tubes are tightly clamped by a force due to the weight of the tube $b$. The bracket will therefore take the weight of the tube $b$ as soon as it has been placed in position and before the fastening device $h$ has been applied. The device is finally secured by fitting the member $h$ into the slots provided in the projecting ends $f$ and then tightening the screw against the tube $a$.

The device is well adapted for securing a horizontal bar $b$ to a vertical post $a$ in the manner shown in the drawing. It will be obvious, however, that the post $a$ need not be vertical. The device could be used to fasten tubes or bars together in any position.

The particular shape and construction of the device shown in the drawing may be varied without departing from the invention. For example the bracket $c$ could be made from an iron bar of round or square section by bending the bar to a U-shape so that it will fit round the tube $a$, and then bending each of the legs of the U to a V shape so that they will hook round and support a tube $b$.

It is to be understood that by the statement that the legs $d$ are "hooked round" the tube $b$ we mean to convey that they engage round the tube $b$ sufficiently to support it when the legs $d$ are hooked round the tube $b$ from above so that the ends of the legs $d$ pass beneath the tube $b$. However, the legs $d$ need not extend far enough to embrace the tube $a$ when they are hooked round the tube $b$. Instead of extending the legs so that they embrace the tube $a$ we employ a modification of the fastening member $h$ adapted to embrace the tube $a$ and provide with hooked or other extensions adapted to engage the legs so as to enable these legs to be tightened against the bar $b$ as effectively as with the construction shown in the drawing.

I claim:

1. A releasable fastening device for fastening together upright and transverse scaffolding members, comprising a rigid bracket composed of a sheet of metal doubled to form an intermediate bend to fit around the upright member and a pair of substantially parallel legs to lie at opposite sides of said member, said legs being slotted to form hooks located below said bend and engageable beneath the transverse member and capable of sustaining the full load of the latter, the portion of said bracket at the junction of the upper portions of the slots with said intermediate bend being cut away to provide a pivot point therefor on the upright member which is so located relatively to the hooks as to cause the latter to clamp the transverse member under the weight thereof and to release it by pivotal movements of the bracket on such pivot point.

2. A releasable fastening device for fastening together upright and transverse scaffolding members, comprising a rigid bracket composed of a sheet of metal doubled to form an intermediate bend to fit around the upright member and a pair of substantially parallel legs to lie at opposite sides of said member, said legs being slotted to form hooks located below said bend and engageable beneath the transverse member and capable of sustaining the full load of the latter, the portion of said bracket at the junction of the upper portions of the slots with said intermediate bend being cut away to provide a pivot point therefor on the upright member which is so located relatively to the hooks as to cause the latter to clamp the transverse member under the weight thereof and to release it by pivoted movements of the bracket on such pivot point, and means detachably engageable with the legs below the slots therein and operable upon the upright member to securely clamp the scaffolding members together.

3. A releasable fastening device for fastening together upright and transverse scaffolding members, comprising a rigid bracket composed of a sheet of metal doubled to form an intermediate bend to fit around the upright member and a pair of substantially parallel legs to lie at opposite sides of said member, said legs being slotted to form hooks located below said bend and engageable beneath the transverse member and capable of sustaining the full load of the latter, the portion of said bracket at the junction of the upper portions of the slots with said intermediate bend being cut away to provide a pivot point therefor on the upright member which is so located relatively to the hooks as to cause the latter to clamp the transverse member under the weight thereof and to release it by pivotal movements of the bracket on such pivot point, the extremities of the legs of the bracket below the slots therein being extended to straddle the upright member, and means detachably engageable with said leg extremities and operable upon the upright member to clamp the scaffolding members together.

ALBERT ARCHIBALD THORNTON.